(12) United States Patent
Colgrove

(10) Patent No.: US 7,320,008 B1
(45) Date of Patent: Jan. 15, 2008

(54) DATA PROTECTION MECHANISM

(75) Inventor: John A. Colgrove, Los Altos, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 374 days.

(21) Appl. No.: 11/017,300

(22) Filed: Dec. 20, 2004

(51) Int. Cl.
*G06F 7/00* (2006.01)
*G06F 17/00* (2006.01)
*G06F 11/30* (2006.01)
*G06F 12/14* (2006.01)
*H04L 9/32* (2006.01)

(52) U.S. Cl. ...................................... 707/102; 713/193
(58) Field of Classification Search ................ 707/102, 707/103 R
See application file for complete search history.

(56) References Cited

U.S. PATENT DOCUMENTS

| | | | | |
|---|---|---|---|---|
| 7,152,165 | B1* | 12/2006 | Maheshwari et al. | 713/193 |
| 2003/0208686 | A1* | 11/2003 | Thummalapally et al. | 713/193 |
| 2004/0133588 | A1* | 7/2004 | Kiessig et al. | 707/102 |
| 2007/0011469 | A1* | 1/2007 | Allison et al. | 713/193 |

OTHER PUBLICATIONS

John Gilmore, "What's Wrong With Copy Protection," http://web.archive.org/web/20031202163916/http:/www.toad.com/gnu/whatswrong.html, Feb. 16, 2001, (6 pages).

* cited by examiner

*Primary Examiner*—Wilson Lee
*Assistant Examiner*—Cheryl M Shechtman
(74) *Attorney, Agent, or Firm*—Robert C. Kowert; Meyertons, Hood, Kivlin, Kowert & Goetzel, P.C.

(57) ABSTRACT

System and method for protecting data systems such as file systems, volume managers, databases, and backup systems. In embodiments, rather than encrypting the data of a data system, one or more elements or levels of metadata may be encrypted. Some embodiments may encrypt metadata that is not accessed frequently to minimize the cost of encryption and decryption. Alternatively, instead of encrypting an entire metadata, only a portion, such as a header block, of the metadata may be encrypted. The encrypted metadata may be stored in the data system. At startup of the data system, the encrypted metadata may be decrypted and an unencrypted copy of the metadata may be cached in memory for use by the data system software. If the decrypted metadata is modified, then the encrypted metadata may be replaced with an encrypted version of the modified metadata. Format(s) of the metadata that is encrypted may be copyrighted.

22 Claims, 12 Drawing Sheets

DATA PROTECTION MECHANISM

BACKGROUND OF THE INVENTION

1. Field of the Invention

This invention is related to the field of computer systems and, more particularly, to data protection mechanisms for data systems.

2. Description of the Related Art

A data system may be defined as a generic term for any system that stores and manages access to data (e.g. files, records, etc.) typically stored or maintained on some type of logical or physical storage devices. Exemplary types of data systems may include, but are not limited to, file systems, databases, backup systems, and volume managers. A data system typically includes the data itself, typically stored on one or more of some type or types of logical and/or physical device, and data system metadata which references or describes the data, and which may also be stored on some type of logical or physical device, either with the data or on a separate device. The data and metadata, when set into a logical hierarchy, make up an organized, structured set of information. Data system software may provide the functionality needed to manage and access the data in the data system.

FIG. 1 illustrates an exemplary generic data system. Data system 110 may include data 114 stored on one or more storage devices 112. Storage devices 112 may include physical and/or logical devices. A storage device 112 may be any type of computer-accessible medium capable of storing data 114 including, but not limited to: storage media or memory media such as magnetic or optical media, stand-alone disk, RAID (Redundant Array of Independent Disks) systems, JBODs (Just a Bunch Of Disks, used to refer to disk cabinets that do not have a built-in RAID controller), any of one or more types of backup devices, including, but not limited to, various types of tape devices and optical storage devices, CD-ROM (CD, CD-R, or CD-RW), volatile or non-volatile media such as RAM (e.g. SDRAM, DDR, RDRAM, SRAM, etc.), ROM, Flash Memory, MEMS, etc. A data system 110 may include one or more types of storage devices 112. The type or types of storage devices 112 used in a data system 110 may depend on the characteristics or purposes of that particular data system 110. For example, a backup system may typically, but not necessarily, use some form of tape or optical storage device to store data.

Metadata 120 that references data 114 may also be stored on one or more of the storage devices 112. Metadata 120 may be a data structure or structures that may include, but is not limited to, definitions, descriptions, and location information for the data it references. Data system software 100 may provide the functionality needed to manage and access the data in the data system. (As used herein, the term data system software may be used to reference the software that provides the functionality needed to manage and access the data in the data system as well as any associated hardware needed to store and/or execute the data system software and/or that itself provides functionality for managing and accessing the data in the data system.) The data system software 100 may manage access the data 114 in the data system 110 using the data system metadata 120 which references the data 114. There may be one or more levels of metadata 120 in a data system 110; for example, the data system software 100 may access a second level of metadata that directly references data 114 through a first level of metadata, which may include a table or index to elements in the second level of metadata. One or more applications 104 may store or access data 114 in the data system 110 via the data system software 100, which in turn may access the data 114 in the data system 110 using metadata 120 on behalf of the application(s) 104.

In many data systems, it may be necessary or desirable to protect at least some of the data in the data system. One mechanism for protecting data in a data system is encryption. Conventionally, encryption may be applied only to the data of a data system, or alternatively to the metadata and data of the data system. FIG. 2 illustrates an exemplary generic data system in which the data may be encrypted. FIG. 2 shows the metadata and data of a data system 110 as a logical hierarchy with two layers of metadata (metadata 120 and metadata 122) between data system software 100 and data 114. Some or all of data 114 may be encrypted to protect the data. Alternatively, data 114 and one or more layers of the metadata may be encrypted. Any of various types of encryption algorithms may be used to encrypt the metadata; the particular encryption algorithm used is not significant, but note that a particular encryption algorithm may be selected to match the requirements of the particular data system.

Encryption of data 114 may be expensive in terms of performance. The overhead introduced by performing encryption of data 114 during each storage to data system 110 and decryption of data 114 during each access of data from data system 110 may significantly impact the performance of data system 110, for example when providing access to data system 110 to application(s) 104.

File Systems

An exemplary type of data system is a file system. A file system may be defined as a collection of files and file system metadata (e.g., directories, inodes, inode lists, log files, object location tables, etc.) that, when set into a logical hierarchy, make up an organized, structured set of information. File systems may be mounted from a local system or remote system. File system software may include the system or application-level software that may be used to create, manage, and access file systems.

File system metadata may be defined as information that file system software maintains on files stored in the file system. File system metadata may include, but is not limited to, definitions and descriptions of the data it references. File system metadata may include one or more of, but is not limited to, inodes, directories, mapping information in the form of indirect blocks, superblocks, etc. Generally, file system metadata for a file includes path information for the file as seen from the application side and corresponding file system location information (e.g. device:block number(s)). File system metadata may itself be stored on a logical or physical device within a file system. A file system may use metadata (e.g., in an inode table or list, master file table, or object location table), which may itself be part of the data stored in the allocated extents, to track where each portion of each file is stored.

File systems may use data structures such as inodes or entries in master file tables to store file system metadata. The data structure may hold information about files in a file system (e.g. a Unix or Windows file system). There may be a data structure for each file, and a file may be uniquely identified by the file system on which it resides and its corresponding data structure on that system. A data structure for a file may include at least some of, but is not limited to, the following information: the device where the file resides, locking information, mode and type of file, the number of links to the file, the owner's user and group IDs, the number of bytes in the file, access and modification times, the time the data structure for the file itself was last modified and the addresses of the file's blocks on disk (and/or pointers to indirect blocks that reference the file blocks).

SUMMARY

Embodiments of a system and method for protecting data systems such as file systems, volume managers, databases, and backup systems are described. In embodiments, rather than (or in addition to) encrypting the data of a data system, a data protection mechanism may encrypt one or more elements or levels of data system metadata while (optionally) not encrypting the data stored in the data system itself. The encrypted metadata may be formatted according to a proprietary format. The expression of the encrypted metadata and/or the format of the metadata may be copyrighted.

Some embodiments may encrypt a metadata data structure that does not change very frequently and/or is not accessed very frequently to minimize the cost of encryption and decryption. For example, a basic lookup index, used to locate other metadata data structures or the data itself, may be encrypted. Alternatively, instead of encrypting the entire metadata data structure, only a portion of the metadata data structure may be encrypted. For example, only a header block or header blocks of the metadata data structure that tells where information in the metadata data structure is located, and thus which may be necessary to reconstruct the entirety of the metadata data structure from the storage device, may be encrypted.

The one or more encrypted metadata data structures may be stored on the storage device(s) in the data system. In one embodiment, at startup of the data system, the encrypted metadata data structure(s) may be decrypted and an unencrypted copy of the metadata data structure(s) may be cached in memory for use by the data system software. The encrypted version of the metadata data structure(s) may be maintained on a storage device or devices in the data system. If the unencrypted version of the metadata data structure(s) is modified, then the old version of the encrypted metadata may be replaced with an encrypted version of the modified metadata in the data system.

In some data systems, only a portion of the data in a data system may need to be protected. Thus, some embodiments of the data protection mechanism may be configured to encrypt only a portion of the metadata that references the portion of the data in the data system that needs to be protected.

The data system may be, for example, a file system implemented and managed by file system software, a database implemented and managed by database software, a data system comprising one or more logical volumes implemented and maintained on one or more physical devices by a volume manager, or a backup system comprising one or more backup volumes generated and maintained by backup software. For a file system, the encrypted metadata may be, for example, an inode list configured for accessing inodes associated with the data or an object location table configured for accessing one or more other metadata data structures in the file system. For a database, the encrypted metadata may be a data structure configured for accessing the records in the database. For a data system implemented by a volume manager, the encrypted metadata may be a configuration database that defines and describes the configuration of the logical volumes on the physical devices. For a backup system, the encrypted metadata may be a backup database configured for accessing the data on the backup volumes. For any such data system in which encryption of metadata is implemented as described herein, the format or expression of at least the portions of the data system metadata being encrypted may be copyrighted.

BRIEF DESCRIPTION OF THE DRAWINGS

The following detailed description makes reference to the accompanying drawings, which are now briefly described.

Figure 1:
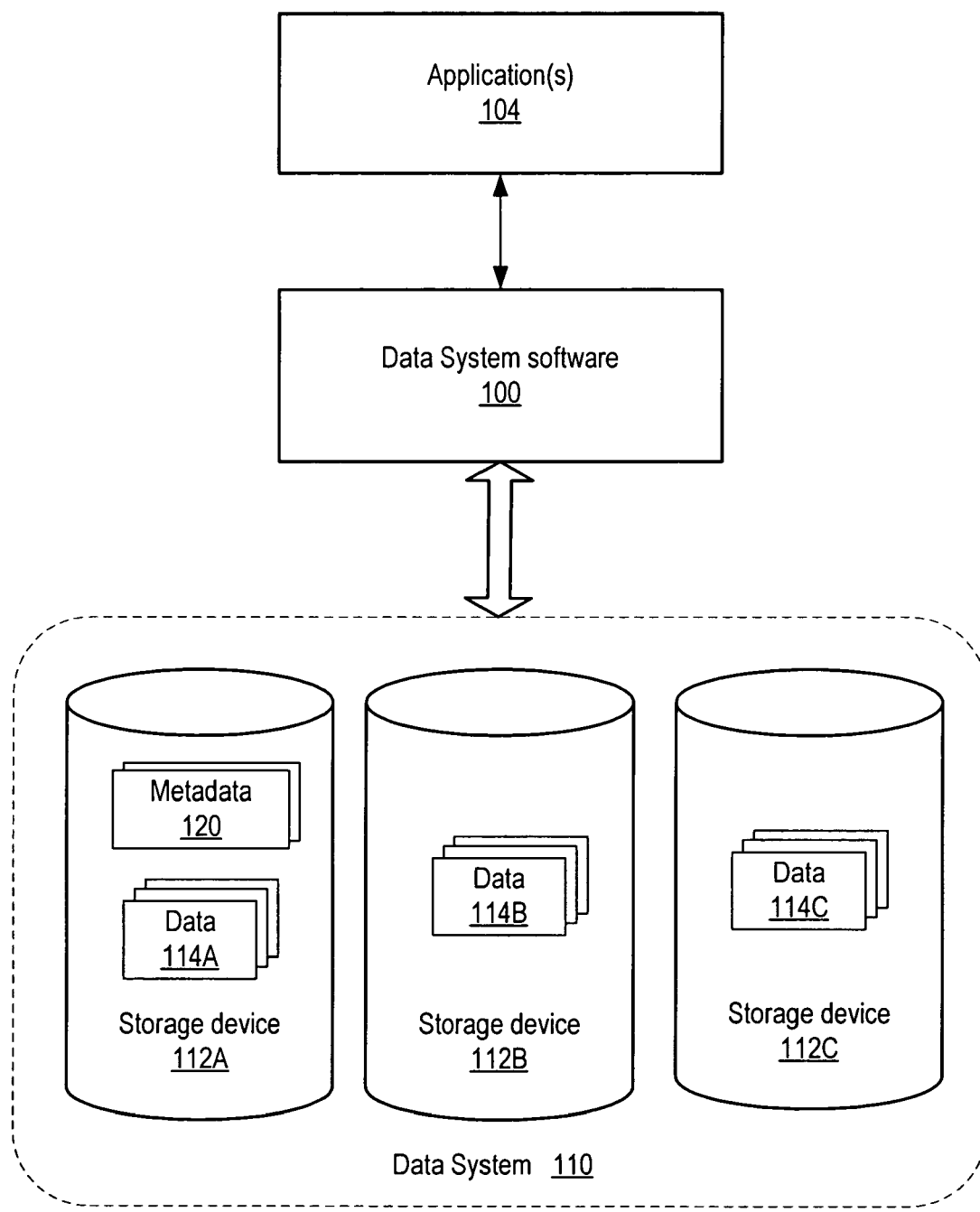
FIG. 1 illustrates an exemplary generic data system.
Figure 2:
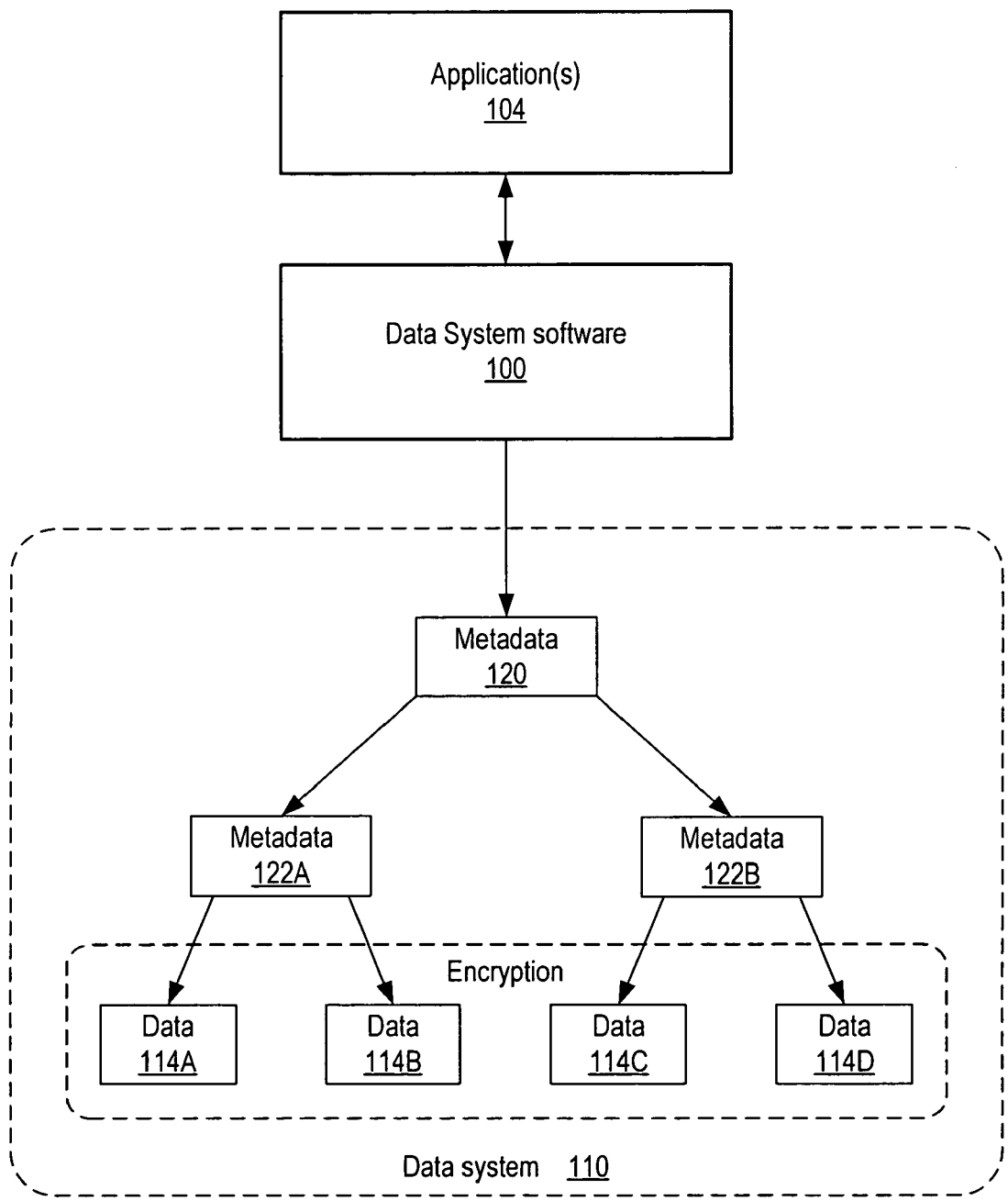
FIG. 2 illustrates an exemplary generic data system in which the data may be encrypted.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for protecting data systems such as file systems, volume managers, databases, and backup systems are described. In embodiments, rather than encrypting the data of a data system as in conventional data protection mechanisms for data systems, a data protection mechanism may encrypt (and decrypt when necessary)

one or more elements or levels of data system metadata while not encrypting, and thus not decrypting, the data stored in the data system itself. The encrypted metadata may be formatted according to a proprietary format. The expression of the encrypted metadata and/or the format of the metadata may be copyrighted.

In many data systems, the metadata may be necessary to locate, access, reconstruct and/or understand the data itself. Many data systems may use proprietary formats and/or layouts for their data and/or metadata. Thus, it may be difficult or impossible to reconstruct the data into a meaningful form without having access to the metadata. For example, the data elements in a file system or database may be stored on the storage device(s) in such a way that the data is essentially unintelligible without having the metadata to locate and reconstruct the data elements into files or records. Thus, encrypting one or more metadata data structures in a data system may provide protection for the data in the data system because, without access to the unencrypted metadata, it may be difficult or impossible to reconstruct the stored data elements into data structures such as files or records. Also note that there may be two or more layers of metadata, and one layer (a "higher" layer) of metadata may be necessary to locate, access, reconstruct, and/or understand the one or more layers of metadata below the higher layer. Thus, in one embodiment, rather than encrypting all of the metadata or a lower layer of metadata, one or more data structures of a higher layer of metadata may be encrypted to effectively protect the data in the data system. For any such data system in which encryption of metadata is implemented as described herein, the format or expression of at least the portions of the data system metadata being encrypted may be copyrighted.

There may be a cost in performance when encrypting or decrypting a data structure; therefore, some embodiments may encrypt a metadata data structure that does not change very frequently and/or is not accessed very frequently to minimize the cost of encryption and decryption. For example, a basic lookup index, used to locate other metadata data structures or the data itself, may be encrypted. In a file system, for example, a metadata data structure that does not change very often such as a superblock or an object location table that tells where to find other metadata such as the file system log, inode list(s), etc. may be encrypted rather than some other metadata that may change more frequently such as the actual inodes or directory entries for a file. Alternatively, instead of encrypting the entire metadata data structure, only a portion of the metadata data structure may be encrypted. For example, only a header block or header blocks of the metadata data structure that tells where information in the metadata data structure is located, and thus which may be necessary to reconstruct the entirety of the metadata data structure from the storage device, may be encrypted. As another example, a portion of metadata that allows access to some other metadata structure(s) such as the file pointers of an object location table may be encrypted. As yet another example, a portion of metadata that allows access to data (e.g. the block maps in inodes) may be encrypted.

The one or more encrypted metadata data structures may be stored on the storage device(s) in the data system. In one embodiment, at startup of the data system, the encrypted metadata data structure(s) may be decrypted and an unencrypted copy of the metadata data structure(s) may be cached in memory for use by the data system software. The encrypted version of the metadata data structure(s) may be maintained on a storage device or devices in the data system. If the unencrypted version of the metadata data structure(s) is modified, then the old version of the encrypted metadata may be replaced with an encrypted version of the modified metadata in the data system.

Figure 3A:
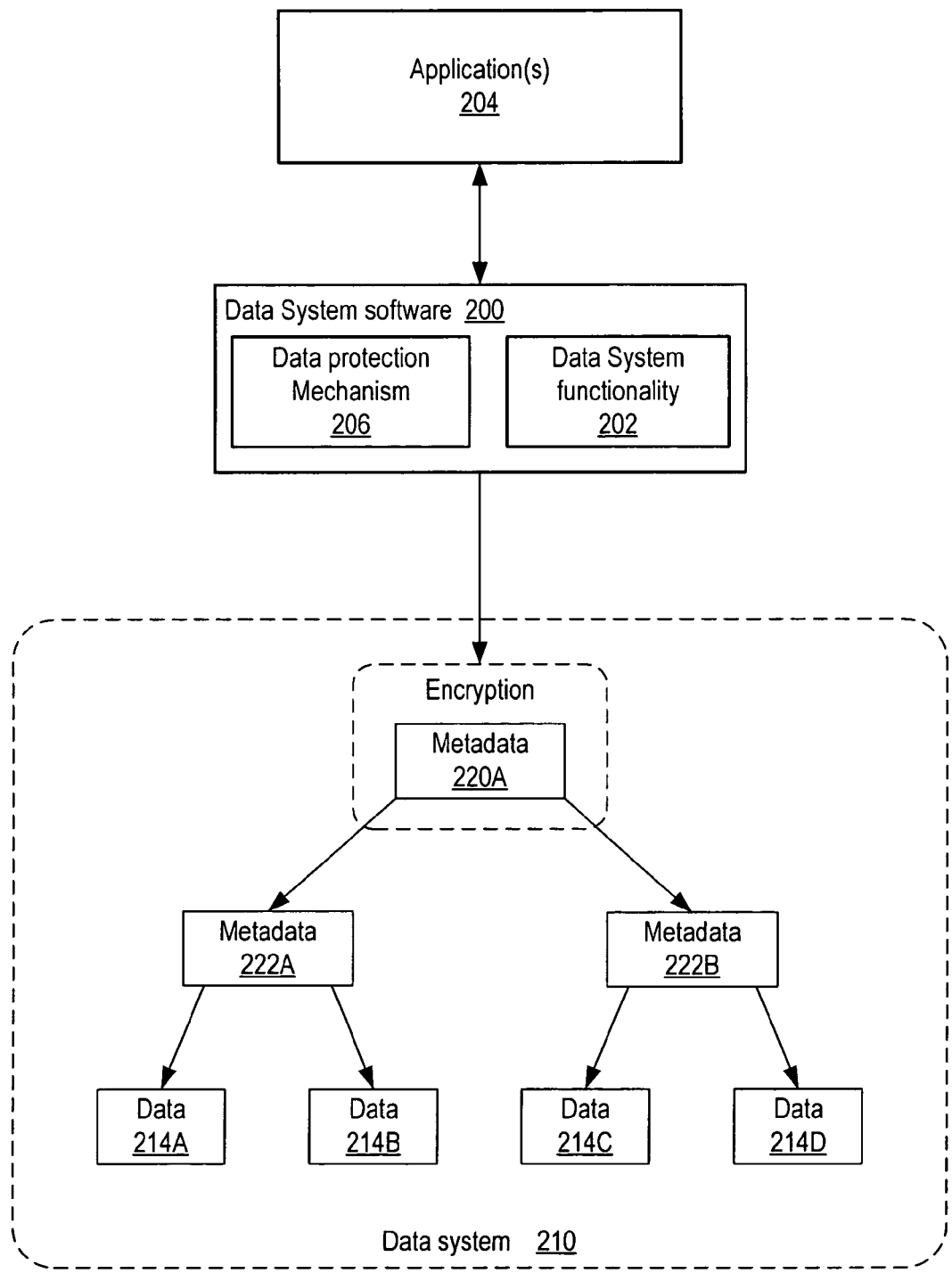
FIGS. 3A through 3C illustrate an exemplary generic data system in which a metadata data structure may be encrypted according to one embodiment.
Figure 3B:
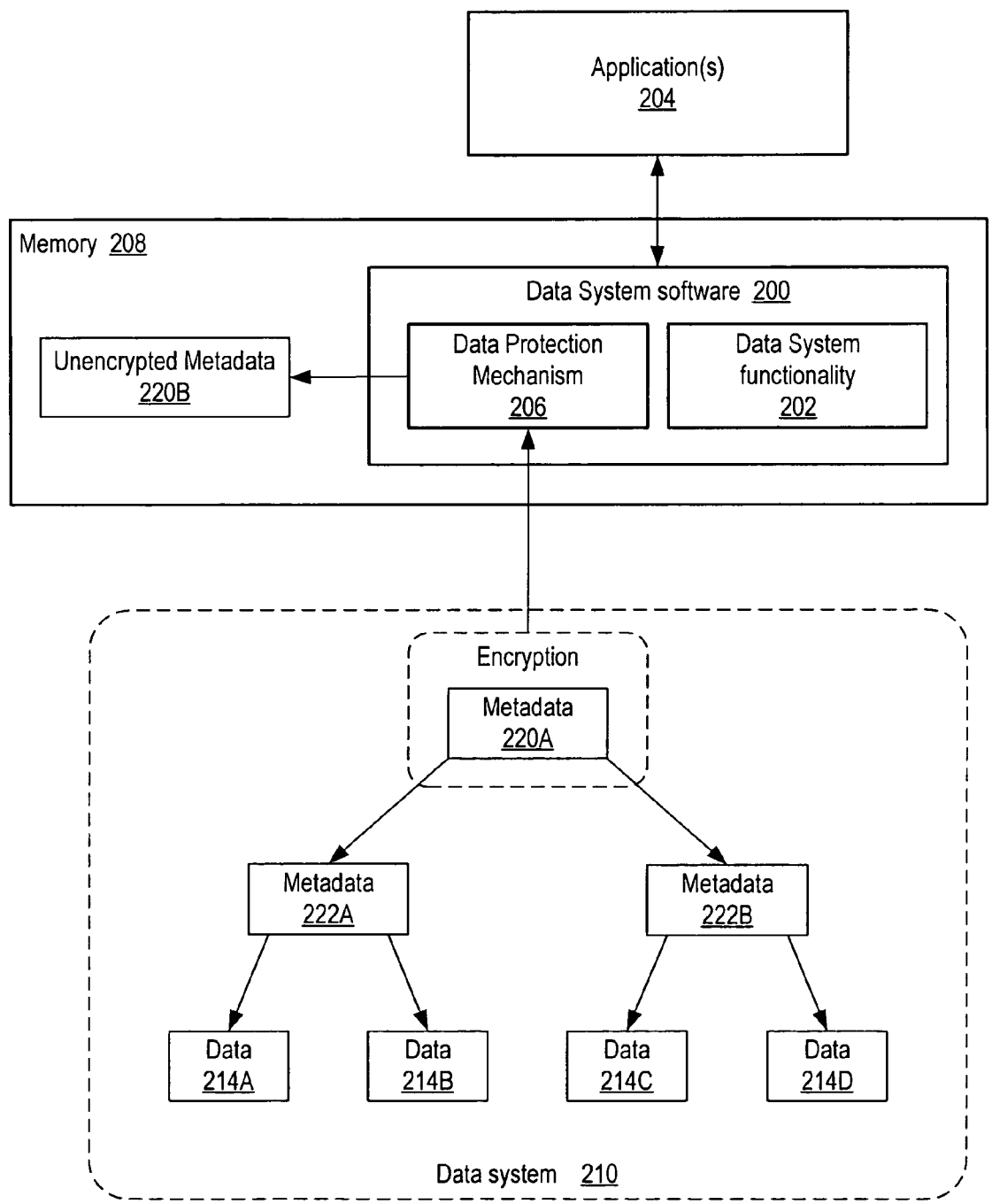
Figure 3C:
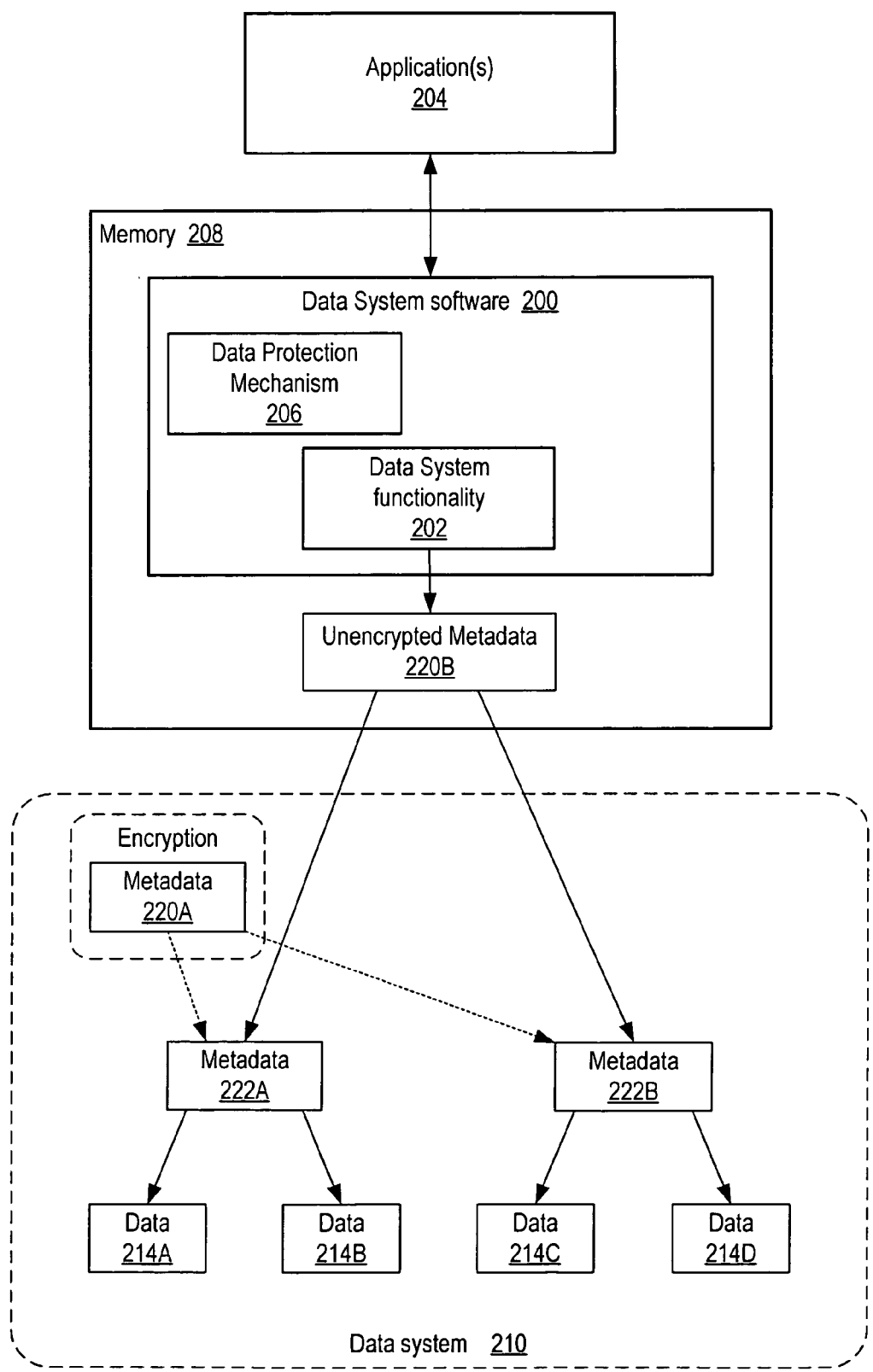

FIGS. 3A through 3C illustrate an exemplary generic data system in which a metadata data structure may be encrypted according to one embodiment. FIG. 3A shows a data system 210 as a logical hierarchy with two layers of metadata (metadata 220A and metadata 222A and 222B) between data system software 200 and data 214. Metadata 220A may be a data structure or data structures on a first level of metadata for the data system 210, and may, for example, include information for locating metadata 222A and 222B on a second level of the metadata. Metadata 222A and 222B may include information for locating various elements of data 214 in the data system 210.

Data system software 200 may include data system functionality 202 for performing the operations of the particular data system 210 and a data protection mechanism 206 that implements data protection for the data 214 in the data system via encryption of metadata on one or more levels as described herein. Application(s) 204 may access the data system 210 via data system software 200.

In this example, metadata 220A may be encrypted to protect the data 214, while metadata 222 and data 214 are not encrypted. Alternatively, data structures of metadata 222 (metadata 222A and 222B) may be encrypted, or both metadata 220A and metadata 222 may be encrypted. Any of various types of encryption algorithms may be used to encrypt the metadata; the particular encryption algorithm used is not significant, but note that a particular encryption algorithm may be selected to match the security and performance requirements of the particular data system 210.

In FIG. 3B, in one embodiment, at startup of the data system 210, the encrypted metadata 220A may be decrypted and an unencrypted copy of the metadata 220B may be cached in memory for use by the data system software 200. The encrypted version of the metadata 220A may be maintained on a storage device in the data system 210.

In FIG. 3C, in one embodiment, during operation of the data system 210, the data system functionality 202 of data system software 200 may access the data system using the unencrypted metadata 220B cached in memory. In this example, data system functionality 202 may access unencrypted metadata 220B to locate metadata 222A and/or metadata 222B to access and manage elements of data 214 stored in data system 210. Operations performed by the data system functionality 202 of data system 210 in accessing and managing of data 214 may include, but is not limited to, storing, creating, deleting, copying, moving, and modifying elements of data 214. The particular operations performed by data system functionality 202 may depend upon the nature of the particular data system. For example, at least some of the operations performed by a file system may be different than the operations performed by a volume manager.

If the unencrypted version of the metadata 220B is modified, then the old version of the encrypted metadata 220A may be replaced with an encrypted version of the modified metadata 220B in the data system.

In some data systems, only a portion of the data 214 in a data system may need to be protected. Thus, some embodiments of the data protection mechanism 206 may be configured to encrypt only a portion of the metadata that references the portion of the data 214 in the data system that needs to be protected. For example, in the exemplary, generic data system 210 of FIGS. 3A through 3B, it may be the case that only data 214A and 214B need to be protected, and data protection mechanism 206 may be configured to encrypt only metadata 222A, or alternatively only a portion of metadata 220 that references metadata 222A, to thus provide protection to data 214A and 214B and not to data 214C and 214D.

FIGS. 4 through 8 illustrate exemplary types of data systems in which metadata may be encrypted to protect the data in the data system according to embodiments of a data protection mechanism as described herein.

Figure 4:
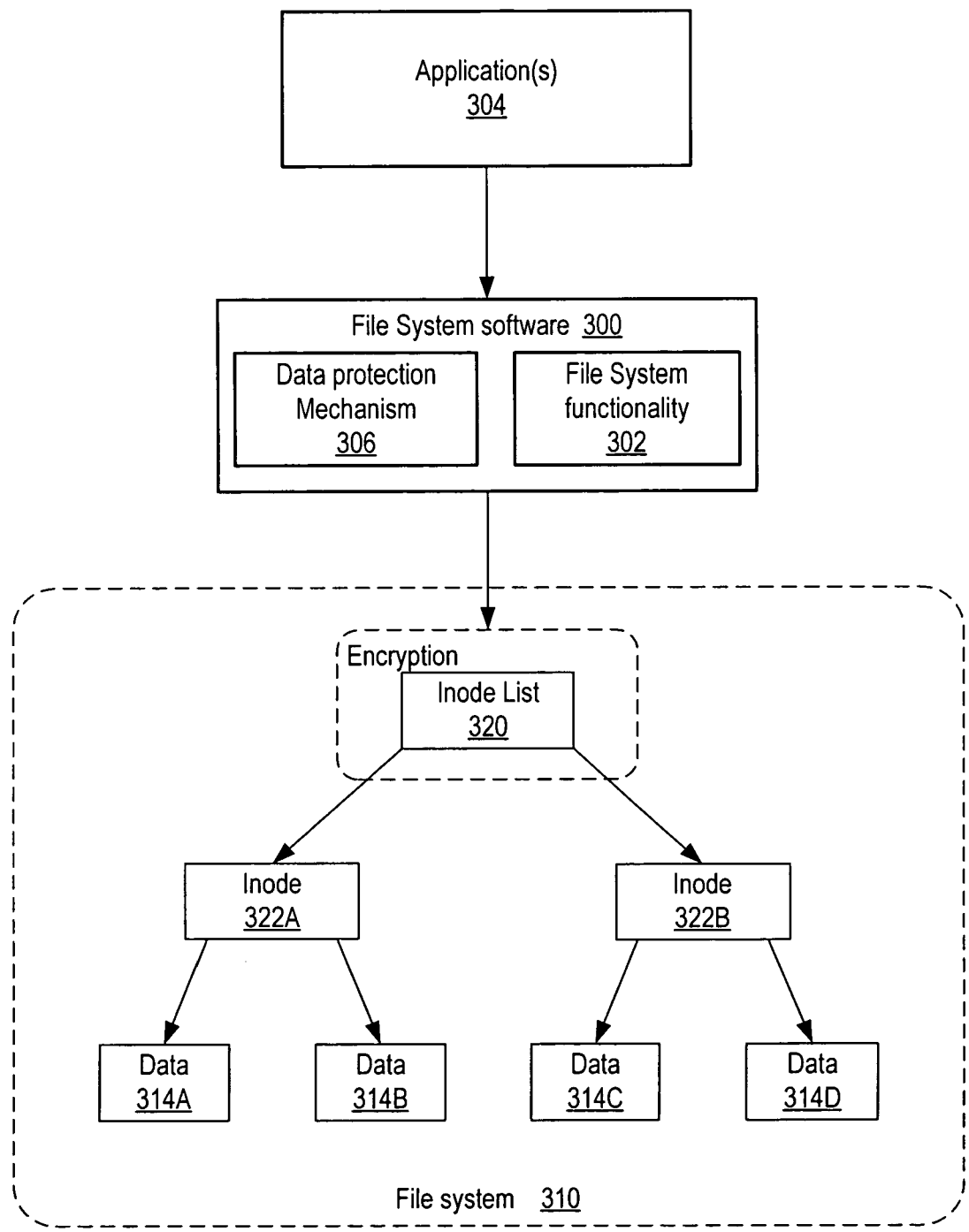
FIG. 4 illustrates a file system with an Inode list and Inodes as metadata between file system software and data in which the Inode list is encrypted according to one embodiment.
Figure 5:
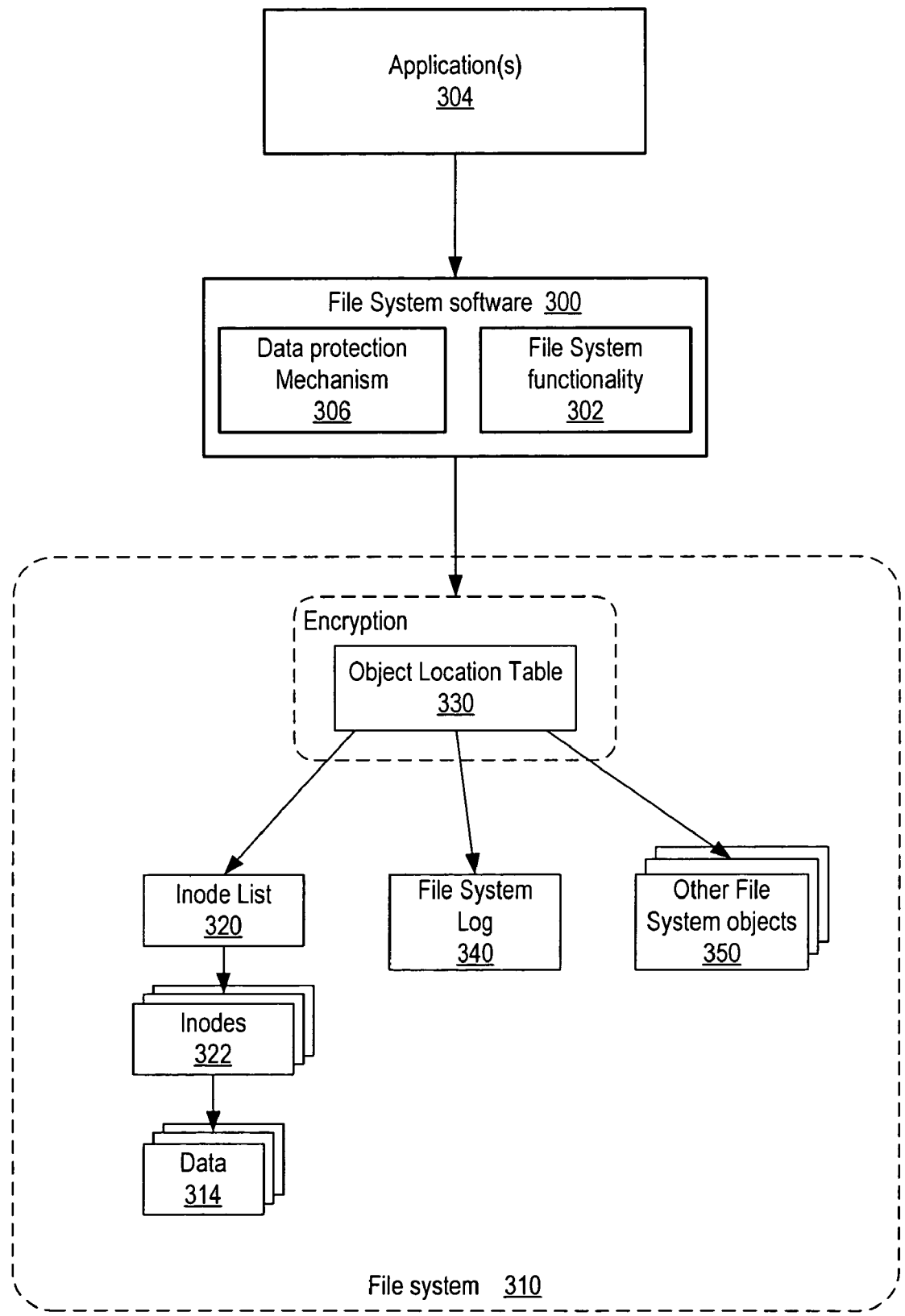
FIG. 5 illustrates a file system with several layers of metadata between file system software and data in which an Object Location Table is encrypted according to one embodiment.

FIGS. 4 and 5 illustrate exemplary file systems in which metadata may be encrypted to protect the data in the file systems according to embodiments of a data protection mechanism as described herein. Note that the exemplary file systems use particular data structures as metadata such as object location tables, Inodes, and Inode lists, and are not intended to be limiting. Other file systems may use other data structures as metadata; embodiments of the data protection mechanism may be used in these other file systems to protect data in the file system by encrypting one or more levels of metadata data structures in those file systems in a similar fashion as described for the exemplary file systems of FIGS. 4 and 5. File systems in FIGS. 4 and 5 may be representative of any of various File System implementations including, but not limited to, file systems such as VERITAS' VxFS and UNIX File System (UFS), and Microsoft's NTFS (New Technology File System).

FIG. 4 illustrates a file system 310 as a logical hierarchy with two layers of metadata (Inode list 320 and Inodes 322A and 322B) between file system software 300 and data 314 according to one embodiment. Data 314 may represent files or portions of files, for example portions of files stored in blocks, extents, or records, which are accessible as files via the metadata for the file system 310. Inode list 320 may be a data structure or data structures on a first level of metadata for the file system 310, and may, for example, include information for locating Inodes 322A and 322B on a second level of the metadata. Inodes 322A and 322B may include information for locating various elements of data 314 in the file system 310. File system software 300 may include file system functionality 302 for performing the operations of the file system 310 and a data protection mechanism 306 that implements data protection for the data 314 in the file system via encryption of metadata on one or more levels as described herein. Application(s) 304 may access the file system 310 via file system software 300.

In this example, Inode list 320 may be encrypted to protect the data 314, while inodes 322 and data 314 are not encrypted. Alternatively, Inodes 322A and 322B may be encrypted, or both Inode list 320 and Inodes 322 may be encrypted. Any of various types of encryption algorithms may be used to encrypt the metadata; the particular encryption algorithm used is not significant, but note that a particular encryption algorithm may be selected to match the security and performance requirements of the file system 310.

In one embodiment, at startup of the file system 310, the encrypted Inode list 320 may be decrypted and an unencrypted copy of the Inode list may be cached in memory for use by the file system software 300. The encrypted version of the Inode list 320 may be maintained on a storage device in the file system 310. In one embodiment, during operation of the file system 310, the file system functionality 302 of file system software 300 may access the Inodes 322 in file system 310 using the unencrypted Inode list cached in memory. If the unencrypted version of the Inode list is modified, then the version of the encrypted Inode list 220 may be replaced with an encrypted version of the modified Inode list in the file system 310.

FIG. 5 illustrates a file system 310 as a logical hierarchy with several layers of metadata between file system software 300 and data 314 according to one embodiment. A first level of metadata may be an Object Location Table 330 or other similar data structure that may be used by the file system to locate various objects (e.g., other metadata data structures) in the file system 310. In this example, Object Location Table 330 may include information for locating an inode list 320, one or more file system logs 340, and one or more other file system objects 350, including other metadata data structures. An Object Location Table 330 is typically not read from or written to very often. Inode list 320 may be a data structure or data structures that may, for example, include information for locating Inodes 322. Inodes 322 may include information for locating various elements of data 314 in the file system 310. File system software 300 may include file system functionality 302 for performing the operations of the file system 310 and a data protection mechanism 306 that implements data protection for the data 314 in the file system via encryption of metadata on one or more levels as described herein. Application(s) 304 may access the file system 310 via file system software 300.

In this example, Object Location Table 330 may be encrypted to protect the data 314. Alternatively, Object Location Table 330 and Inode list 320 may be encrypted, Object Location Table 330 and Inodes 322 may be encrypted, or Object Location Table 330, Inode list 320 and Inodes 322 may all be encrypted. Note that, in some embodiments, only the header block(s) that indicate where records in the Object Location Table are located, or a similar structure, for a file system's Object Location Table 330 may be encrypted, rather than encrypting the entire metadata data structure. Any of various types of encryption algorithms may be used to encrypt the metadata; the particular encryption algorithm used is not significant, but note that a particular encryption algorithm may be selected to match the security and performance requirements of the file system 310.

In one embodiment, at startup of the file system 310, the encrypted Object Location Table 330 may be decrypted and an unencrypted copy of the Object Location Table may be cached in memory for use by the file system software 300 in locating file system objects, including the Inode list 320. The encrypted version of the Object Location Table 330 may be maintained on a storage device in the file system 310. In one embodiment, during operation of the file system 310, the file system functionality 302 of file system software 300 may access the objects, including metadata such as Inode list 320, in file system 310 using the unencrypted Object Location Table cached in memory. If the unencrypted version of the Object Location Table is modified, then the version of the encrypted Object Location Table 330 may be replaced with an encrypted version of the modified Object Location Table in the file system 310.

Figure 6:
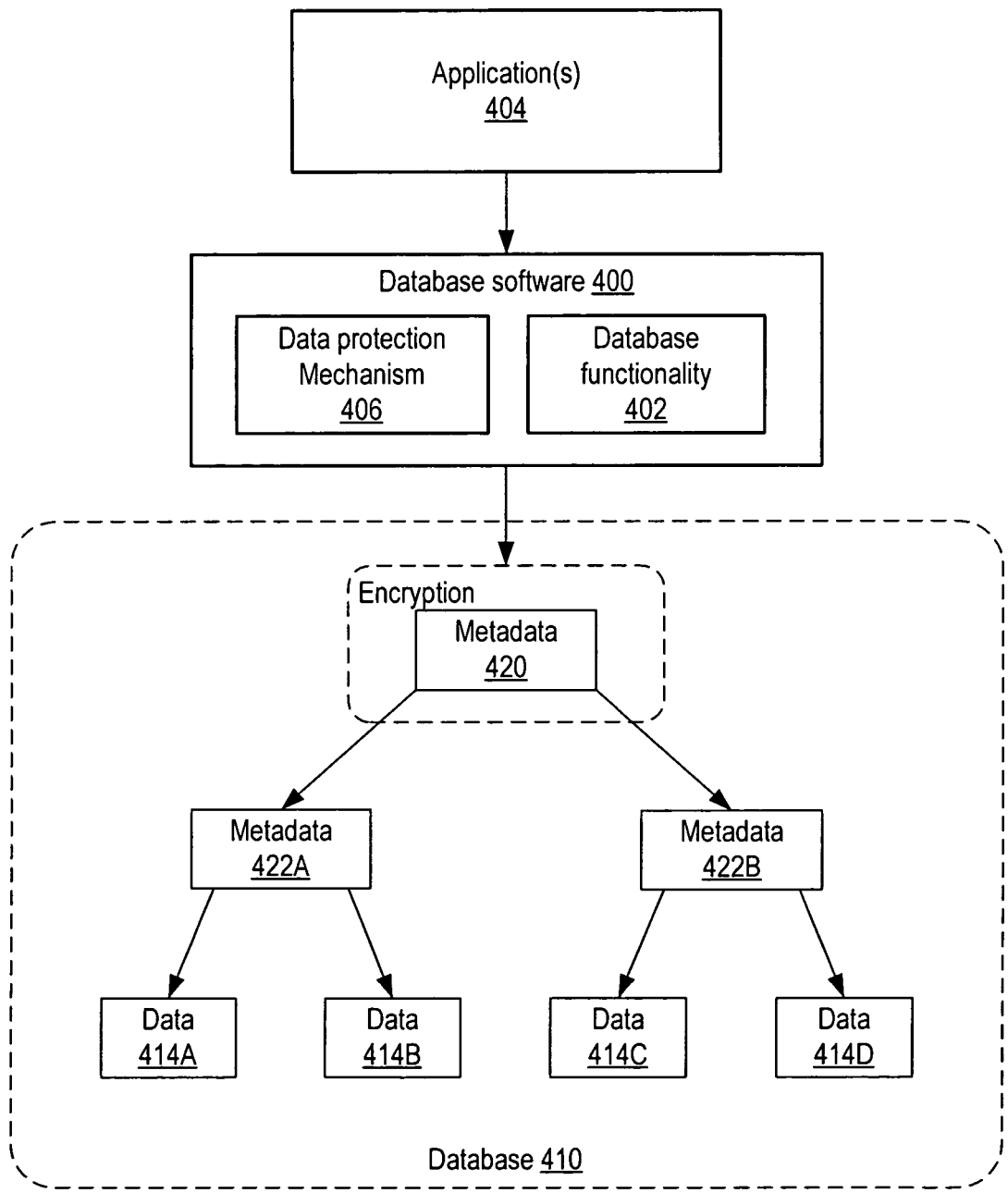
FIG. 6 illustrates an exemplary database in which metadata may be encrypted to protect the data in the database according to one embodiment.

FIG. 6 illustrates an exemplary database in which metadata may be encrypted to protect the data in the database according to one embodiment. FIG. 6 shows a database 410 as a logical hierarchy with two layers of metadata (metadata 420 and metadata 422A and 422B) between database software 400 and data 414. Database 410 may be a database of any data model or function, including, but not limited to: analytical and operational (referring to the function of the database); hierarchical, network, relational, and object databases (referring to the data model of the data base). Different database systems may use different data structures for the metadata in the database, such as data libraries, tables, records, files, relational records in relational databases, etc. "Metadata" for databases as used in FIG. 6 is thus meant to include any data structure that is used as metadata in the database. Metadata 420 may be a data structure or data structures on a first level of metadata for the database 410, and may, for example, include information for locating metadata 422A and 422B on a second level of the metadata for the database 410. Metadata 422A and 422B may include information for locating various elements of data 414 in the database 410. Database software 400 may include database functionality 402 for performing the operations of the database 410 and a data protection mechanism 406 that implements data protection for the data 414 in the database via encryption of metadata on one or more levels as described herein. Application(s) 404 may access the database 410 via database software 400.

In this example, metadata 420 may be encrypted to protect the data 414, while metadata 422 and data 414 are not encrypted. Alternatively, metadata 422A and 422B may be encrypted, or both metadata 420 and metadata 422 may be encrypted. Note that, in some embodiments, only header blocks or similar structures for a database's metadata data structure, and that indicate where information in the metadata data structure is located, may be encrypted, rather than encrypting the entire metadata data structure. Any of various types of encryption algorithms may be used to encrypt the metadata; the particular encryption algorithm used is not significant, but note that a particular encryption algorithm may be selected to match the security and performance requirements of the database 410.

In one embodiment, at startup of the database 410, the encrypted metadata 420 may be decrypted and an unencrypted copy of the metadata 420 may be cached in memory for use by the database software 400. The encrypted version of the metadata 420 may be maintained on a storage device in the database 410. In one embodiment, during operation of the database 410, the database functionality 402 of database software 400 may access the metadata 422 in database 410 using the unencrypted metadata 420 cached in memory. If the unencrypted version of the metadata 420 is modified, then the version of the encrypted metadata 420 may be replaced with an encrypted version of the modified metadata 420 in the database 410.

Figure 7:
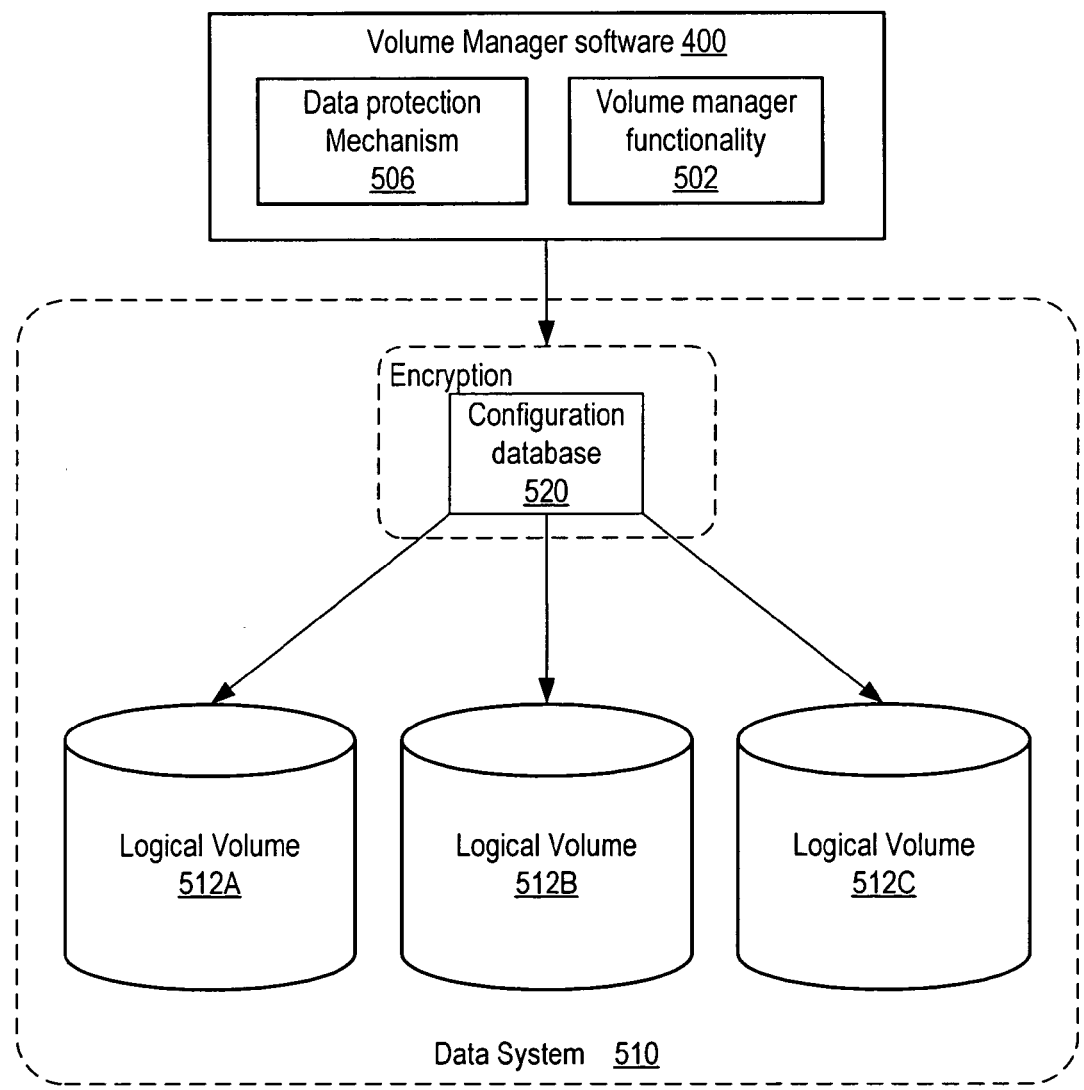
FIG. 7 illustrates an exemplary volume manager in which metadata may be encrypted to protect the data for the volume manager according to one embodiment.

FIG. 7 illustrates an exemplary volume manager in which metadata may be encrypted to protect the data for the volume manager according to one embodiment. FIG. 7 shows a data system 510, configured by volume manager software 500, as a logical hierarchy with a configuration database 520 as metadata used by the volume manager software 500 that describes and defines a configuration of one or more logical volumes 512 implemented on one or more physical devices (not shown). Note that different volume manager systems may use different data structures for the metadata than a "configuration database"; the following discussion may be applied to any such metadata data structure used in a volume manager system. Configuration database 520 may be a data structure or data structures that may, for example, include information describing the configuration for logical volumes 512A, 512B, and 512C on one or more physical devices. Volume manager software 500 may include volume manager functionality 502 for performing the operations of the data system 510 related to configuration of the logical volumes 512 and a data protection mechanism 406 that implements protection for the configuration of the logical volumes 512 in the data system via encryption of the configuration database 520. Data system 510 may, for example, be used by a file system for which volume manager software 500 is used to allocate the logical volumes 512 in the data system 510 for file system data storage.

In this example, configuration database 520 may be encrypted to protect the configuration of the data system 510. Note that, in some embodiments, only the header blocks or similar structures for the configuration database 520 that indicate where records in the configuration database 520 are located may be encrypted, rather than encrypting the entire configuration database 520. Any of various types of encryption algorithms may be used to encrypt the configuration database 520; the particular encryption algorithm used is not significant, but note that a particular encryption algorithm may be selected to match the security and performance requirements of the particular volume manager system.

In one embodiment, at startup of the data system 510, the encrypted configuration database 520 may be decrypted and an unencrypted copy of the configuration database 520 may be cached in memory for use by the volume manager software 500. The encrypted version of the configuration database 520 may be maintained on a storage device in the data system 510. In one embodiment, during operation of the data system 510, the volume manager functionality 502 of volume manager software 600 may access the configuration of the logical volumes 512 in the data system 510 using the unencrypted configuration database 520 cached in memory. If the unencrypted version of the configuration database 520 is modified, then the version of the encrypted configuration database 520 may be replaced with an encrypted version of the modified configuration database 520 on the storage device.

Figure 8:
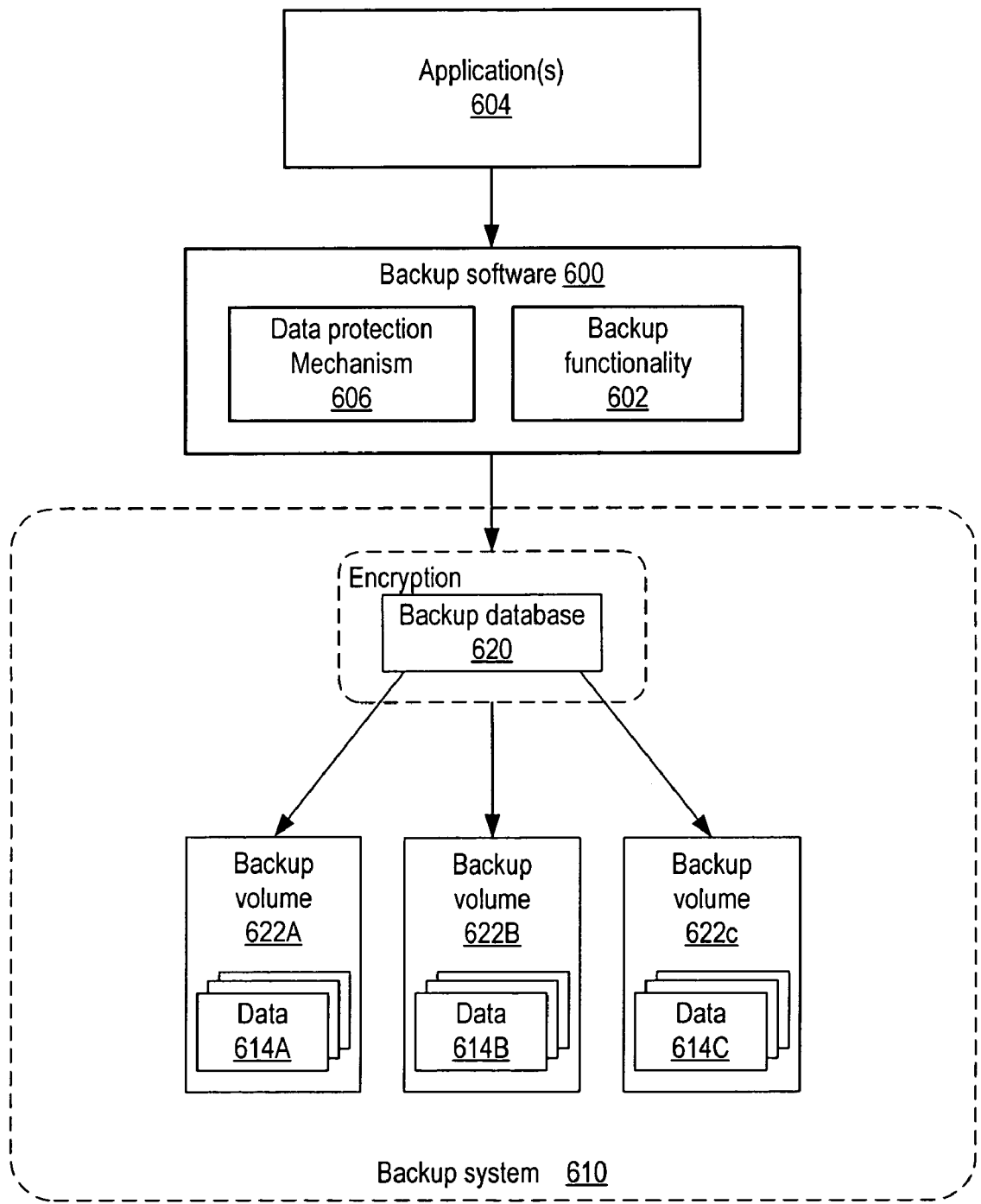
FIG. 8 illustrates an exemplary backup system in which metadata may be encrypted to protect the data in the backup system according to one embodiment.

FIG. 8 illustrates an exemplary backup system in which metadata may be encrypted to protect the data in the backup system according to one embodiment. FIG. 8 shows a backup system 610, generated and maintained by backup software 600, as a logical hierarchy with a backup database 620 as metadata that may be used by the backup software 600 to define, describe, and locate backup volumes 622 in backup system 610, and also the data 614 backed up to the backup volumes 622. Note that different backup systems may use different data structures for the metadata than a "backup database"; the following discussion may be applied to any such metadata data structure used in a backup system. Also note that backup software 600 may use a proprietary data format for storing data 614 on backup volumes 622, and the format may not be readable without knowledge of the proprietary format and access to the backup database 614.

Backup database 620 may be a data structure or data structures that may, for example, include information describing the backup volumes 622A, 622B, and 622C on one or more backup storage media, for example tapes or optical storage devices, and may also include information describing the location of data 614 on the backup volumes. Backup database 620 may be stored on one or more of the backup volumes 622, or alternatively on some other storage device accessible to backup software 600. Backup software 600 may include backup functionality 602 for performing the operations of the backup system 610, including, but not limited to, the creation, deletion, or copying of backup volumes 622, the storage of data 614 to backup volumes 622, and the reading of data 614 from backup volumes 622. Backup software 600 may, for example, be used by a file system to backup (and retrieve, if necessary) file system data to (or from) the backup volumes 622 of backup system 610.

In this example, backup database 620 may be encrypted to protect the data 614 stored on the backup volumes 622 of backup system 610. As mentioned, backup database 620 may be stored on one or more of the backup volumes 622, or alternatively on some other storage device accessible to backup software 600. Wherever the backup database 620 for the backup system 610 is stored, the backup database 610 is encrypted. Note that, in some embodiments, only the header blocks or similar structures for the backup database 620 that indicate where records in the backup database 620 are located may be encrypted, rather than encrypting the entire backup database 620. Any of various types of encryption algorithms may be used to encrypt the backup database 620; the particular encryption algorithm used is not significant, but note that a particular encryption algorithm may be selected to match the security and performance requirements of the particular backup system.

In one embodiment, at startup of the backup system 610, the encrypted backup database 620 may be decrypted and an unencrypted copy of the backup database 620 may be cached in memory for use by the backup software 600. The encrypted version of the backup database 620 may be maintained on a backup volume or volumes 622 in the backup system 610 or alternatively on some other storage device. In one embodiment, during operation of the backup system 610, the backup functionality 602 of backup software 600 may access the backup volumes 622 and the data 614 stored on the backup volumes in the backup system 610 using the unencrypted backup database 620 cached in memory. If the unencrypted version of the backup database 620 is modified, then the version of the encrypted backup database 620 may be replaced with an encrypted version of the modified backup database 620 on the backup volume(s) 622 or other storage device.

Figure 9:
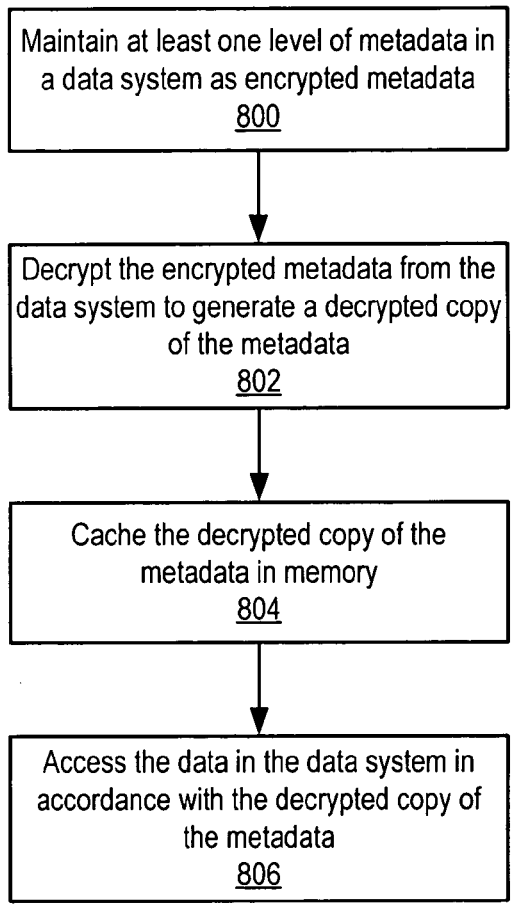
FIG. 9 is a flowchart illustrating a method of implementing a data protection mechanism in a data system according to one embodiment.

FIG. 9 is a flowchart illustrating a method of implementing a data protection mechanism in a data system according to one embodiment. A data system may be implemented on one or more storage devices by data system software. The data system may include data stored on the storage devices and one or more levels of metadata configured for accessing the data on the storage devices. As indicated at 800, the data system software may maintain at least one level of the metadata as encrypted metadata in the data system on the one or more storage devices. The data in the data system may not be encrypted, and may not be accessible without access to unencrypted metadata for the data system. In one embodiment, only a portion of the metadata, such as a header block or some other data structure that includes information for accessing the rest of the metadata, may be encrypted.

As indicated at 802, at startup of the data system, the data system software may decrypt the encrypted metadata from the data system to generate a decrypted copy of the metadata. As indicated at 804, the data system software may cache the decrypted copy of the metadata in memory. As indicated at 806, the data system software may then access the data in the data system in accordance with the decrypted copy of the metadata cached in memory. Note that the encrypted copy of the metadata may be maintained on the storage device(s).

The data system may be, for example, a file system implemented and managed by file system software, a database implemented and managed by database software, a data system comprising one or more logical volumes implemented and maintained on one or more physical devices by a volume manager, or a backup system comprising one or more backup volumes generated and maintained by backup software. For a file system, the encrypted metadata may be, for example, an inode list configured for accessing inodes associated with the data or an object location table configured for accessing one or more other metadata data structures in the file system. For a database, the encrypted metadata may be a data structure configured for accessing the records in the database. For a data system implemented by a volume manager, the encrypted metadata may be a configuration database that defines and describes the configuration of the logical volumes on the physical devices. For a backup system, the encrypted metadata may be a backup database configured for accessing the data on the backup volumes.

Figure 10:
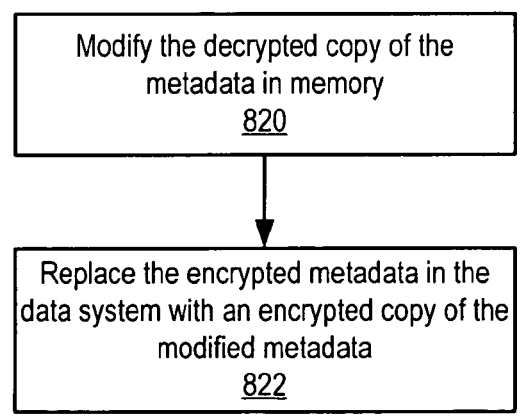
FIG. 10 is a flowchart of a method of replacing encrypted metadata in a data system according to one embodiment.

FIG. 10 is a flowchart of a method of replacing encrypted metadata in a data system according to one embodiment. As indicated at 820, the data system software may modify the decrypted copy of the metadata cached in the memory at 804 of FIG. 9. The data system software may then replace the encrypted metadata in the data system with an encrypted copy of the modified metadata, as indicated at 822.

Figure 11:
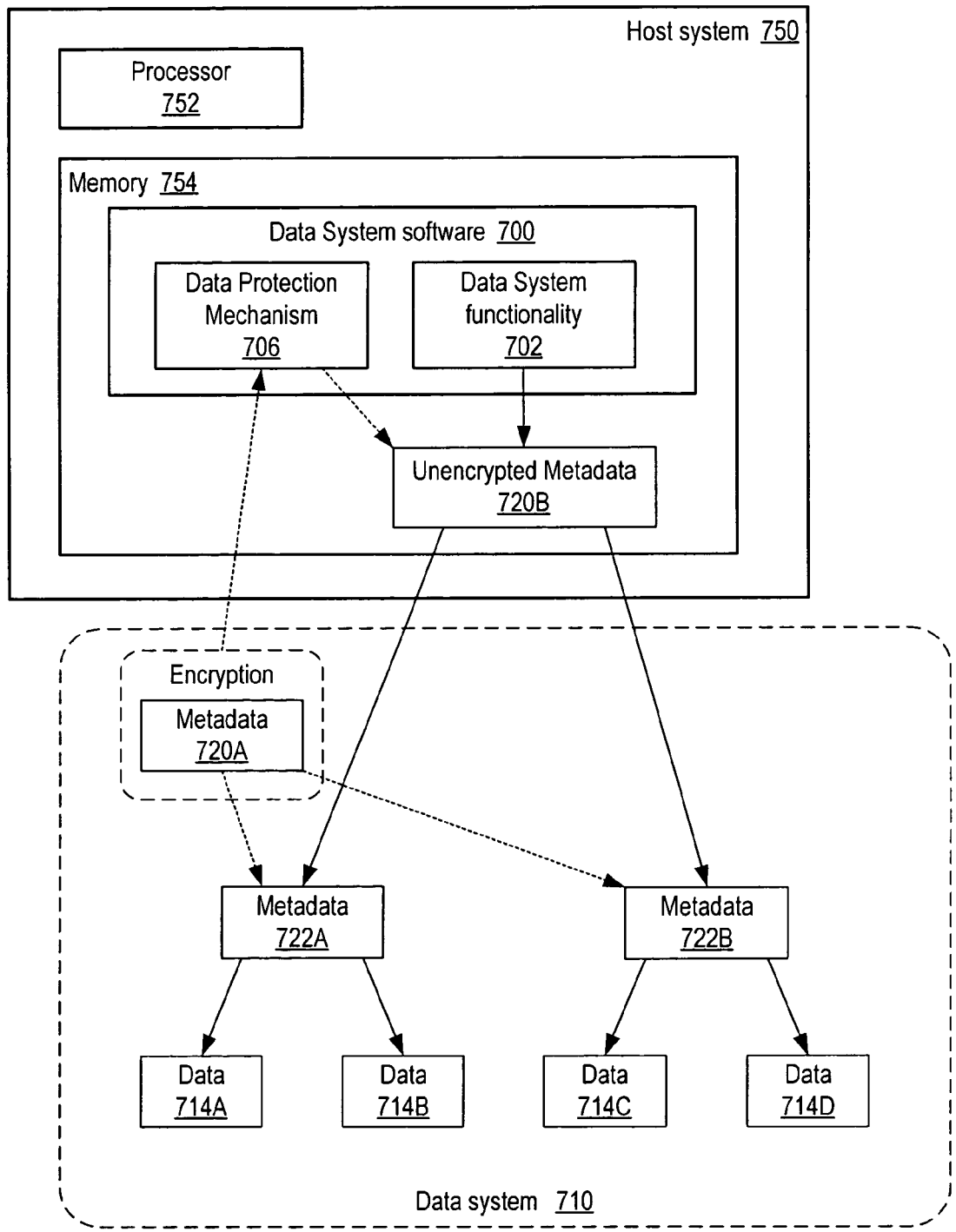
FIG. 11 illustrates an exemplary host system including data system software implementing a data system and including a data protection mechanism according to one embodiment.

FIG. 11 illustrates an exemplary host system including data system software implementing a data system and including a data protection mechanism according to one embodiment. Exemplary types of data systems may include, but are not limited to, file systems, databases, backup systems, and volume managers. Host system 750 may be any of various types of devices, including, but not limited to, a personal computer system, desktop computer, laptop or notebook computer, server, mainframe computer system, workstation, network computer, or other suitable device. Host system 750 may include at least one processor 752. The processor 752 may be coupled to a memory 754. Memory 754 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Host system 750 may couple, for example over a wired or wireless network or networks, to one or more other devices via one or more wired or wireless network interfaces. Host system 750 may couple, over a network or by some other type of connection such as direct connection, to one or more storage devices on which a data system 710 is implemented by data system software 700. A network may, for example, be a Storage Area Network (SAN), a LAN with Network-Attached Storage (NAS), or any network capable of coupling storage devices to a host system 750. The storage devices used to implement the data system 710 may include any of one or more types of storage devices, and may include physical and/or logical devices. A storage device may be any type of computer-accessible medium capable of storing data 714 including, but not limited to: storage media or memory media such as magnetic or optical media, stand-alone disk, RAID systems, JBODs, any of one or more types of backup devices, including, but not limited to, various types of tape devices and optical storage devices, CD-ROM (CD, CD-R, or CD-RW), volatile or non-volatile media such as RAM (e.g. SDRAM, DDR, RDRAM, SRAM, etc.), ROM, Flash Memory, MEMS, etc. A data system 710 may include one or more types of storage devices. The type or types of storage devices used in a data system 710 may depend on the characteristics or purposes of that particular data system 710.

Host system 750 may include, in memory 754, data system software 700. Data system software 700 may include, but is not limited to, an embodiment of the data protection mechanism 706 that implements data protection for the data 714 in the data system 710 via encryption of metadata on one or more levels as described herein, and data system functionality 702 that for performing the operations of the particular data system 710. Data system software 700 may be software for implementing and managing any of various types of data systems. Exemplary types of data systems may include, but are not limited to, file systems, databases, backup systems, and volume managers. Application(s) (not shown) may access the data system 710 via data system software 700.

Data system 710 is shown as a logical hierarchy with two layers of metadata (metadata 720A and metadata 722A and 722B) between data system software 700 and data 714. Metadata 720A may be a data structure or data structures on a first level of metadata for the data system 710, and may, for example, include information for locating metadata 722A and 722B on a second level of the metadata. Metadata 722A and 722B may include information for locating various elements of data 714 in the data system 710.

In this example, metadata 720A may be encrypted to protect the data 714 on the storage devices in data system 710, while metadata 722 and data 714 are not encrypted. Alternatively, data structures of metadata 722 (metadata 722A and 722B) may be encrypted, or both metadata 720A and metadata 722 may be encrypted. In some embodiments, only a header block or blocks, or other similar structure, for metadata 720A may be encrypted. Any of various types of encryption algorithms may be used to encrypt the metadata; the particular encryption algorithm used is not significant, but note that a particular encryption algorithm may be selected to match the security and performance requirements of the particular data system 710.

In one embodiment, at startup of the data system 710, the encrypted metadata 720A may be decrypted and an unencrypted copy of the metadata 720B may be cached in memory 754 for use by the data system software 700. The encrypted version of the metadata 720A may be maintained on a storage device in the data system 710. In one embodiment, during operation of the data system 710, the data system functionality 702 of data system software 700 may access the data system using the unencrypted metadata 720B cached in memory. In this example, data system functionality 702 may access unencrypted metadata 720B to locate metadata 722A and/or metadata 722B to access and manage elements of data 714 stored in data system 710. Operations performed by the data system functionality 702 of data system 710 in accessing and managing of data 714 may include, but is not limited to, storing, creating, deleting, copying, moving, and modifying elements of data 714. The particular operations performed by data system functionality 702 may depend upon the nature of the particular data system. If the unencrypted version of the metadata 720B is modified, then the old version of the encrypted metadata 720A may be replaced with an encrypted version of the modified metadata 720B in the data system.

Note that the configuration illustrated in FIG. 9 is an exemplary implementation of a host system including data system software implementing a data system and including a data protection mechanism and is not intended to be limiting. Embodiments of the data protection mechanism as described herein may be implemented in other configurations of systems and storage environments. A minimum configuration for implementing an embodiment of the data protection mechanism may be a single system, with one storage device (internal or external) on which the data system is implemented. Other configurations may include two or more hosts systems each implementing a instance of data system software 700 or, alternatively, a portion of data system software 700 in a distributed processing environment. Other configurations may also include two or more (logical or physical) storage devices, which may be coupled to the host system(s) via a wired or wireless network or networks, or by some other connection such as a direct connection.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a processor; and
   a memory comprising program instructions, wherein the program instructions are executable by the processor to implement data system software configured to:
      implement and manage access to a data system on one or more storage devices, wherein the data system comprises data stored on the storage devices and one or more levels of metadata configured for accessing the data on the storage devices; and
      maintain at least one level of the metadata as encrypted metadata in the data system on the one or more storage devices;
   wherein the data in the data system are not encrypted, and wherein the data in the data system are not accessible without unencrypted metadata.

2. The system as recited in claim 1, wherein the data system software is further configured to:
   decrypt the encrypted metadata from the data system to generate a decrypted copy of the metadata;
   cache the decrypted copy of the metadata in the memory; and
   access the data in the data system in accordance with the decrypted copy of the metadata.

3. The system as recited in claim 2, wherein the data system software is further configured to:

modify the decrypted copy of the metadata in the memory; and replace the encrypted metadata in the data system with an encrypted copy of the modified metadata.

4. The system as recited in claim 1, wherein only a portion of the metadata configured for accessing other information in the metadata or a portion of the metadata configured for accessing the data is encrypted.

5. The system as recited in claim 1, wherein the data system is a file system, wherein the data system software is file system software configured for managing the file system, wherein the data are files or portions of files in the file system, and wherein the at least one level of the metadata is an inode list configured for accessing inodes associated with the data or an object location table configured for accessing one or more other metadata data structures in the file system.

6. The system as recited in claim 1, wherein the data system is a database, wherein the data system software is database software configured for managing the database, wherein the data are records in the database, and wherein the at least one level of the metadata is a data structure configured for accessing the records in the database.

7. The system as recited in claim 1, wherein the data system is a data system comprising one or more logical volumes implemented on one or more physical devices, wherein the data system software is volume manager software configured for generating and managing the logical volumes on the physical devices, and wherein the at least one level of the metadata is a configuration database that defines and describes the configuration of the logical volumes on the physical devices.

8. The system as recited in claim 1, wherein the data system is a backup system comprising one or more backup volumes implemented on one or more backup media, wherein the data system software is backup software configured for generating and managing the backup volumes in the backup system, wherein the data are data stored on the backup volumes, and wherein the at least one level of the metadata is a backup database configured for accessing the data on the backup volumes.

9. A system, comprising:

a data system on one or more storage devices, wherein the data system comprises data stored on the storage devices and one or more levels of metadata configured for accessing the data on the storage devices, wherein at least one level of the metadata is stored as encrypted metadata in the data system on the one or more storage devices, wherein the data in the data system are not encrypted, and wherein the data in the data system are not accessible without unencrypted metadata; and a host system configured to couple to the data system, wherein the host system comprises data system software configured to:

decrypt the encrypted metadata from the data system to generate a decrypted copy of the metadata; and access the data in the data system in accordance with the decrypted copy of the metadata.

10. The system as recited in claim 9, wherein the data system software is further configured to cache the decrypted copy of the metadata in memory on the host system.

11. The system as recited in claim 9, wherein the data system software is further configured to:

modify the decrypted copy of the metadata in the memory; and replace the encrypted metadata in the data system with an encrypted copy of the modified metadata.

12. The system as recited in claim 9, wherein only a portion of the metadata configured for accessing other information in the metadata or a portion of the metadata configured for accessing the data is encrypted.

13. A system, comprising:

a processor; and a memory comprising program instructions, wherein the program instructions are executable by the processor to implement file system software configured to:

implement and manage access to a file system on one or more storage devices, wherein the file system comprises file data stored on the storage devices and one or more levels of metadata configured for accessing the file data on the storage devices;

maintain at least one level of the metadata as encrypted metadata in the file system on the one or more storage devices;

decrypt the encrypted metadata from the file system to generate a decrypted copy of the metadata; and access the file data in the file system in accordance with the decrypted copy of the metadata;

wherein the file data in the file system are not encrypted, and wherein the files in the file system are not accessible without unencrypted metadata.

14. The system as recited in claim 13, wherein the at least one level of the metadata is an inode list configured for accessing inodes associated with the data or an object location table configured for accessing one or more other metadata data structures in the file system.

15. A system, comprising:

a processor; and a memory comprising program instructions, wherein the program instructions are executable by the processor to implement database software configured to:

implement and manage access to a database on one or more storage devices, wherein the database comprises records stored on the storage devices and one or more levels of metadata configured for accessing the records on the storage devices;

maintain at least one level of the metadata as encrypted metadata on the one or more storage devices;

decrypt the encrypted metadata from the storage devices to generate a decrypted copy of the metadata; and access the records of the database in accordance with the decrypted copy of the metadata;

wherein the records in the database are not encrypted, and wherein the records in the database are not accessible without unencrypted metadata.

16. A system, comprising:

a processor; and a memory comprising program instructions, wherein the program instructions are executable by the processor to implement volume manager software configured to:

implement and manage one or more logical volumes in a data system on one or more physical devices;

maintain an encrypted copy of a configuration database that describes the configuration of the logical volumes in the data system on a storage device;

decrypt the encrypted configuration database from the storage device to generate a decrypted copy of the configuration database; and manage and access the logical volumes of the data system in accordance with the decrypted copy of the configuration database;

wherein the configuration of the logical volumes in the data system is not accessible without an unencrypted copy of the configuration database.

17. A system, comprising:
a processor; and
a memory comprising program instructions, wherein the program instructions are executable by the processor to implement backup software configured to:
  generate and manage access to one or more backup volumes of a backup system on one or more backup media, wherein each backup volume comprises data stored to the backup volume;
  maintain an encrypted copy of a backup database configured for accessing the data on the backup volumes on a storage device;
  decrypt the encrypted backup database from the storage device to generate a decrypted copy of the backup database; and
  access the data on the backup volumes in accordance with the decrypted copy of the backup database;
wherein the data on the backup volumes are not encrypted, and wherein the data on the backup volumes are not accessible without an unencrypted copy of the backup database.

18. A method, comprising:
maintaining at least one level of metadata as encrypted metadata in a data system implemented on one or more storage devices, wherein the data system comprises data stored on the storage devices and one or more levels of metadata configured for accessing the data on the storage devices;
decrypting the encrypted metadata from the data system to generate a decrypted copy of the metadata;
accessing the data in the data system in accordance with the decrypted copy of the metadata; and
wherein the data in the data system are not encrypted, and wherein the data in the data system are not accessible without unencrypted metadata.

19. The method as recited in claim 18, further comprising:
modifying the decrypted copy of the metadata in the memory; and
replacing the encrypted metadata in the data system with an encrypted copy of the modified metadata.

20. The method as recited in claim 18, wherein the data system is one of a file system implemented and managed by file system software, a database implemented and managed by database software, a data system comprising one or more logical volumes implemented and maintained by a volume manager, and a backup system comprising one or more backup volumes generated and maintained by backup software.

21. A computer-accessible storage medium, comprising program instructions, wherein the program instructions are computer-executable to implement:
  maintaining at least one level of metadata as encrypted metadata in a data system implemented on one or more storage devices, wherein the data system comprises data stored on the storage devices and one or more levels of metadata configured for accessing the data on the storage devices;
  decrypting the encrypted metadata from the data system to generate a decrypted copy of the metadata; and
  accessing the data in the data system in accordance with the decrypted copy of the metadata;
  wherein the data in the data system are not encrypted, and wherein the data in the data system are not accessible without unencrypted metadata.

22. The computer-accessible storage medium as recited in claim 21, wherein the program instructions are further computer-executable to implement:
  modifying the decrypted copy of the metadata in the memory; and
  replacing the encrypted metadata in the data system with an encrypted copy of the modified metadata.

* * * * *